June 9, 1959  E. R. VAN KREVELEN  2,890,409
ELECTROSTATIC TESTING OF SHEET MATERIALS
Filed Jan. 11, 1954  2 Sheets-Sheet 1

INVENTOR.
EDWARD R. VAN KREVELEN
BY
William C. Stueber
ATTORNEY

June 9, 1959  E. R. VAN KREVELEN  2,890,409
ELECTROSTATIC TESTING OF SHEET MATERIALS
Filed Jan. 11, 1954  2 Sheets-Sheet 2
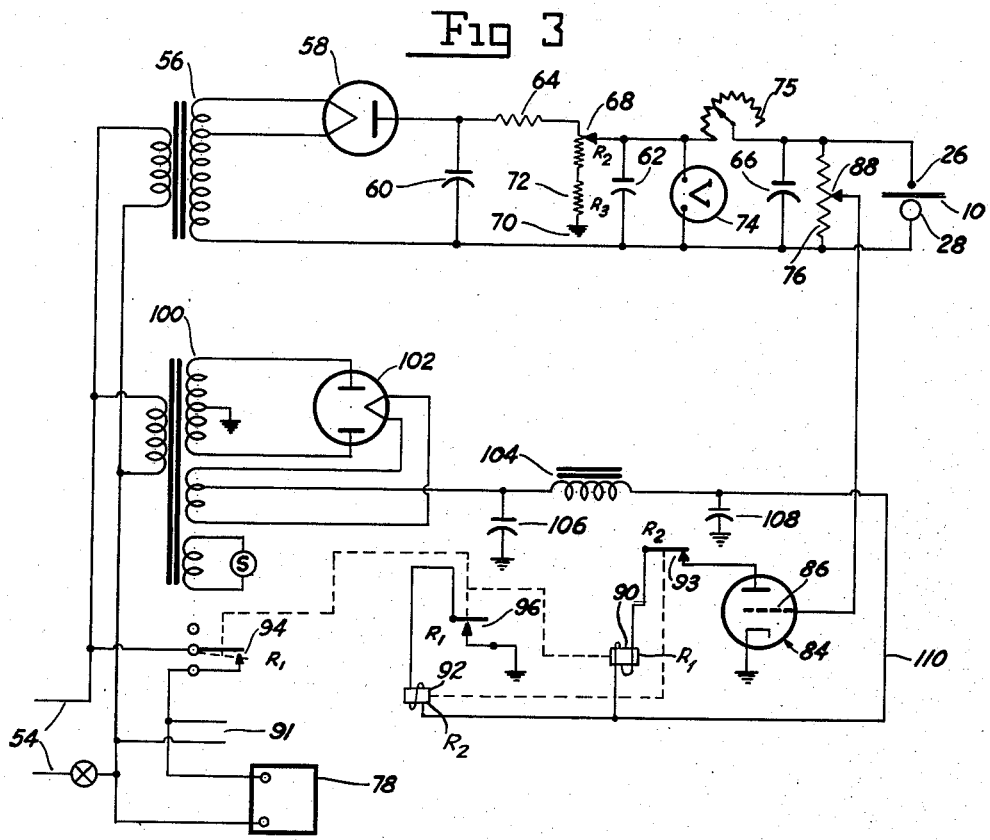
Fig 3
Fig 4
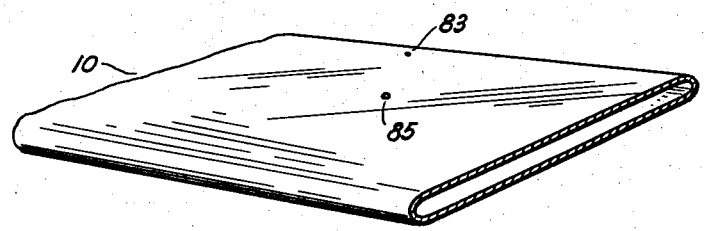
INVENTOR.
EDWARD R. VAN KREVELEN
BY
William C. Stuefer
ATTORNEY

United States Patent Office 2,890,409
Patented June 9, 1959

2,890,409

ELECTROSTATIC TESTING OF SHEET MATERIALS

Edward R. Van Krevelen, Robbinsdale, Minn., assignor to General Mills, Inc., a corporation of Delaware Application January 11, 1954, Serial No. 403,155

7 Claims. (Cl. 324—54)

The present invention relates to improvements in mechanisms for detecting weaknesses in sheet materials.

Sheet materials must be relatively free from imperfections for certain uses. Sheet materials such as plastics, thermoplastics, and rubber are often used in the manufacture of articles where they must be impermeable to liquids, gases, light rays or some similar substance which they are to contain. Where large quantities of sheet materials are used and the materials are to be mass produced it is necessary that a method be available to test the materials in large quantities so that the imperfect materials may be discarded or used for other purposes.

Frequently these materials may contain a number of imperfections or holes which would make them suitable for some purposes but not for others and therefore a mechanism for detecting the number or frequency of holes in a quantity of material is useful for classifying materials. Various devices have heretofore been used for testing, including air pressure, photoelectric cells, electric discharge devices, etc. The mechanisms which utilize air pressure are not practical for continuous testing large quantities of material, and photoelectric cells are not practical for testing material which is transparent in nature and other devices have not been practiced for high speed testing of large quantities or have other disadvantages.

Mechanisms for testing material for holes by testing the dielectric strength of the material have met with certain disadvantages in that they frequently damage the material. These devices employ electrodes on opposite sides of the material charged with a high voltage and when material of reduced dielectric strength such as occasioned by a hole in the material, passes between the electrodes a spark jumps between the electrodes to indicate the hole. The sparks frequently damage the material and often precipitate a series of sparks which "hem stitch" along the material to cause a weakened line.

It is accordingly an object of the present invention to provide an improved device for the rapid and economical testing of large quantities of sheet material having dielectric strength greater than air.

Another object of the invention is to provide mechanism which will test sheet material for weaknesses by utilizing electrodes positioned on opposite sides of the material charged with electricity so as to cause a spark to jump between them when holes or weaknesses appear in the test material but which will not damage the material and which will not continue to discharge so as to damage the material in the areas adjacent the imperfections.

A still further object of the invention is to provide a mechanism which is capable of locating imperfections in materials having dielectric strength which is readily adaptable to materials of different thicknesses and also is adjustable to classify materials having holes at certain different frequencies.

Another object of the invention is to provide a mechanism having spaced electrodes in which the mechanism is capable of prolonged operation and does not require frequent replacement or repair due to the corrosion of the electrodes.

A still further object is to provide a testing machine which will test thin materials and will not damage or scratch the surface of the material.

Other objects and advantages will become more apparent in the following specification taken in connection with the appended drawings in which:

Fig. 3 is a circuit diagram of the electrical portion of the mechanism; and,

Fig. 4 is a perspective view of tubular material which may be tested by the mechanism.

In the mechanism shown illustrating a preferred embodiment of the invention, sheet material is processed through the testing machine and imperfections such as holes or weaknesses are detected, counted, and marked. Because it is desirable to test material in substantial quantities and not tie up the testing machine, the individual holes are not immediately repaired when detected but may be repaired after testing or when the material is used. It may be that the weaknesses will not be repaired but the material may be tested solely to determine whether it meets a certain standard dependent on the number of imperfections per unit length of material. For this purpose a control is employed which automatically indicates the number of imperfections.

One of the important features of the invention is its ability to detect the holes with the discharge of a spark without damaging the material. This will be more fully discussed in connection with the structure of the machine.

Figure 1:
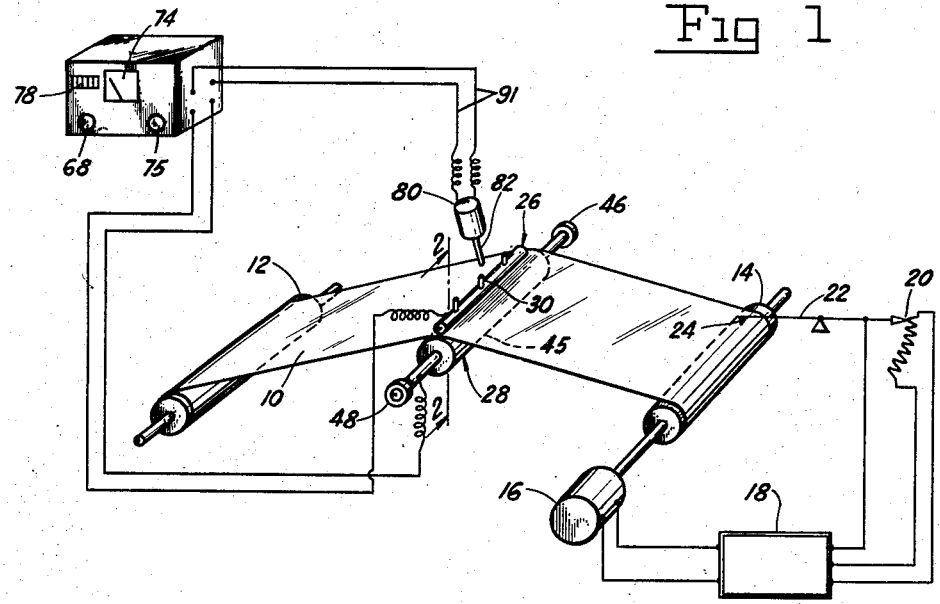
Figure 1 is a perspective view of the mechanism for testing sheet material.

The material 10 to be tested is fed off a supply roll 12 and is gathered on a collecting roll 14, as is shown in Fig. 1. The collecting roll is driven by motor 16, the speed of which is determined by an electrical thyratron controller 18. This control is of the type well known to the motor control art and controls the motor speed by controlling the voltage to the motor. The voltage is regulated by changing the bias on the thyratron tube. The bias is varied by means of a potentiometer 20, the rotation of which is controlled by a pivotal arm 22 having a finger 24 resting on the material. The finger moves responsive to the size of the collecting roll 14. As the roll gets larger the motor 16 is slowed down so that the linear speed of travel of material will remain substantially constant.

The material 10 passes between an upper electrode 26 and a lower electrode 28, the upper electrode being charged positive with respect to the lower. The amount of charge placed on the upper electrode 26 is of such a strength that when the dielectric of the sheet material 10 drops below a certain strength such as occurs when the material has a hole, a spark will jump from the upper to the lower electrode.

Figure 2:
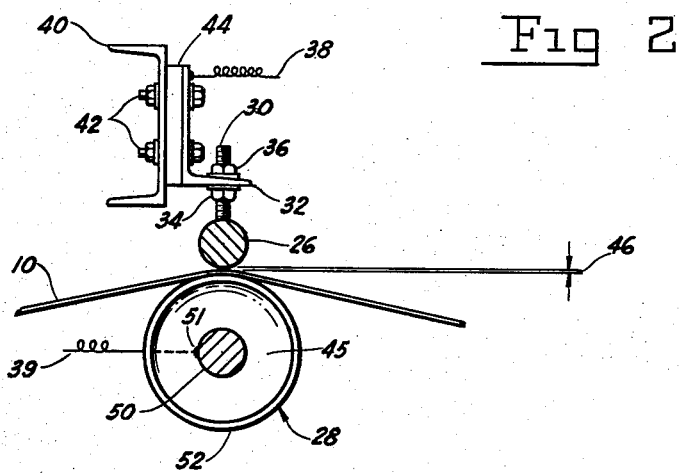
Fig. 2 is a sectional view taken along lines 2—2 of Figure 1.

The upper electrode is shown in the form of a long thin bar 26 as illustrated in Figure 1 and in sectional detail in Fig. 2. The bar is slightly shorter than the width of the material to prevent the spark from jumping around the end of the material and the bar is supported by a series of studs 30 which are located along the bar and project from its top surface. The studs support the rod by being secured in a bracket 32 and project through holes in the bracket with nuts 34 and 36 threaded tightly against the lower and upper surfaces of the bracket. These studs permit leveling the rod and maintaining the gap between the electrodes to a close tolerance.

Electricity is supplied to the upper electrode by a lead 38 secured to the bracket 32 and to the lower electrode by lead 39. The bracket 32 is mounted on a frame 40 by insulated bolts 42 and an insulator plate 44 is located between the bracket and the frame. The upper electrode 26 is adjustable by adjusting the position of the nuts 34 and 36 on the studs 30 on either end of the bar. This adjustment adjusts the spark gap 46 which is the distance between the lower surface of the electrode 26 and the upper surface of the electrode 28. The gap is adjusted so that the material 10 may freely pass between the electrodes and so that the electrical charge between the upper and lower electrodes 26 and 28 can remain within practical limits to obtain a spark discharge with a dielectric strength less than that possessed by the full thickness of the material.

The lower electrode 28 is shown in the preferred form of a cylinder 45 rotatable in bearings 46 and 48. The cylinder 28 is mounted on the shaft 50 which rotates in the bearings 46 and 48. The electrical lead 39 may be connected to the rotatable cylinder 45 by means of a brush 51 bearing against the shaft 50.

The cylinder is plated with a coating 52 of non-corrosive material such as chromium. This reduces the corrosion of the roller from the spark discharge.

As will be seen from Fig. 1 and from the angle of the sheet material in Fig. 2, the supply roll 12 and collecting roll 14 are positioned lower than the rotating cylinder 45 and thus the material bears against the cylinder. Therefore, the cylinder will rotate at a surface speed equal to the speed of the material. Thus it will be seen that there is no danger of the material being abraded against either of the electrodes. Since the material is pulled tightly against the lower electrode it is not in danger of being rubbed against the upper electrode. The lower electrode rotates with the material and therefore there is no opportunity of the lower electrode scratching the material. This freedom from abrasion insures that the material will not be weakened by the testing machine and is especially important where thin materials are tested.

In Fig. 3 the electrical circuit for creating an electrical potential difference between the electrodes 26 and 28 is shown in diagram. A supply voltage is furnished through the leads 54 which may be taken from a conventional 110 volt A.C. circuit available in a shop or laboratory. To increase the voltage a transformer 56 is placed in the circuit. The voltage is then changed to D.C. by means of a rectifier 58 and the circuit is provided with a conventional filter circuit consisting of condensers 60 and 62 and resistor 64. This filtered D.C. voltage is utilized to build up a charge on a main condenser 66 which is connected across the upper and lower terminals 26 and 28 of the testing apparatus. The voltage charge of the condenser, as will be seen from the circuit will if large enough, discharge across the gap between the terminals 26 and 28. With a material 10 of a given dielectric strength and a gap between the terminals of a certain width, the amount of voltage required to discharge across the gap when material is between the electrodes may be readily determined. If the condenser is charged with a voltage of an amount just short of this discharge voltage a spark will not discharge across the gap when it is occupied by the material 10. However, if a certain area of the material 10 has a reduced dielectric strength such as might be caused by a hole or by the material having an area of substandard thickness, its dielectric will be reduced and the condenser 66 will discharge across the electrodes 26 and 28 through the weakened material. The voltage charge on the condenser is controlled by the potentiometer 68 which has its movable arm connected to the condenser 66 and which has one side of the control 75 grounded as shown at 70. An additional resistor 72 may be placed in series with the control 68 to obtain the proper sensitivity. A volt meter 74 may be placed across the line to accurately read the voltage charge placed on the condenser 66.

Therefore, it will be seen that the charge on the condenser 66 creates a potential across the electrodes 26 and 28 and as the material 10 is passed between the electrodes 26 and 28 the condenser is not discharged until a weakness occurs in the material reducing its dielectric strength. At this point the condenser discharges creating a spark across the gap. I have found that there is a small amount of heat generated by this spark which seals minute holes when the material is a thermoplastic. Material such as polyethylene, for example, readily melts at a moderate heat and miniature holes will be sealed by the spark jumping across the gap of the electrodes.

Since the charge impressed on the electrodes is D.C. there is no opportunity for a weakness in the material to pass between the electrodes without detection at an instant when their potential difference is zero, which could happen as an A.C. current fluctuates. This enables the material to be passed between the electrodes at a considerably higher speed than with an A.C. voltage.

A difficulty that has been experienced with impressing an ordinary high voltage supply across electrodes of a testing machine is that the first spark precipitates a series of sparks which will damage the material as it continues to move between the electrodes. In other words, the heat of the spark continues to melt the material ahead of it with a consequent lowering of dielectric strength and a continuation of the spark. When the voltage is supplied by an electrical storage device such as a condenser, however, the supply is temporarily exhausted by a single spark and will not regain its potential until recharged. Therefore only a single spark occupying a fraction of a second will occur and no damage to the material will occur.

The time which is consumed in recharging the condenser 66 is controlled by the resistance of the potentiometer 75. If the potentiometer 75 were omitted from the circuit the voltage across the electrodes 26 and 28 would continue at full strength after the condenser discharged. This has been found to cause a continuous or rapidly intermittent discharge creating a hemstitched appearance on the material where it has been burned by the spark. With the control 75 in the circuit, as soon as the condenser 66 discharges the voltage across electrodes 26 and 28 is reduced by the voltage drop through the control. This voltage drop is of course dependent on the flow of current which is required to build up the condenser 66. There is also a continuous flow through resistance 76 but this resistance 76 is chosen to be of relatively high value so the current flow is relatively low. As soon as the condenser 66 has built up its potential the current flow stops and the voltage drops across control 75 and diminishes until the condenser charges to a value substantially equal to the voltage at the control 68. Its speed of recuperation is, however, dependent upon the setting of the movable control arm 75. Until the condenser has built back to its full potential it actually effectively short circuits the circuit across the electrodes 26 and 28 and no sparking can occur.

When the voltage has been built to its full strength across the condenser, sparking may again occur when the dielectric of the material temporarily diminishes at a weakened spot. The recharging of the condenser 66 of course consumes but a small fraction of a second. Its speed of recharging is determined by the setting of control 75 which determines the time it will take the condenser to recharge and hence determines the minimum time which must elapse between sparks. If the control 75 is set with the movable arm turned to the right, referring to Fig. 3, to obtain a high resistance then the speed of recharging the condenser 66 will be slow and the frequency of holes which can be detected is lower, that is to say, if holes occur so close together that they will pass the electrodes before the condenser 66 has been recharged from the last detected hole they will not be detected.

Therefore, if the mechanism is used to classify material, and holes greater than a certain maximum frequency will put the material in a certain classification, the machine may be set for that frequency and if holes occur in an even greater number, the machine will only register the maximum frequency, and unnecessary spark discharging will not occur.

The detection of holes, evidenced by the spark jumping the gap between the electrodes, is manifested by the machine in two ways. First, a mechanical control 78 counts the number of holes detected. Second, a mechanical marker 80 marks the position of the hole on the material.

The mechanical marker, as shown in Fig. 1, has a stylus 82 with a tip carrying crayon or an inked marker so as to mark the material when brought down against it. The tip of the stylus 82 is normally positioned just above the sheet and when a hole occurs, a solenoid within the marking apparatus 80 forces the stylus briefly against the sheet to place a mark thereon as is illustrated by the mark 83 to indicate the hole 85 in the material in Fig. 4. Although the stylus 82 is positioned at one side of the electrodes and thus will not mark the exact location of the hole, the distance from the stylus to the electrodes is known and when the worker later checks the material he will check the sheet ahead of the stylus marks.

To cause activation of the stylus of the marker 80 a thyratron tube 84 is provided, Fig. 3, which fires and conducts to close a circuit to the marker when the condenser 66 discharges across the electrodes. To effect this the grid 86 of the thyratron is normally kept at a negative potential relative to its cathode being connected to the sliding arm 88 of the potentiometer 76. When the condenser 66 discharges, the voltage on the grid 86 increases in a positive direction firing the thyratron tube and completing the circuit to the relay coils $R_1$. When $R_1$ is energized, contacts 96 close and in turn energize relay coil $R_2$. Relay coil 90 or $R_1$ operates both relay switches 94 and 96. Switch 94 swings from the solid to the dotted line position to place the mechanical counter 78 in circuit with the 110 volt supply voltage furnished by the leads 54. This trips the mechanical counter causing it to count once. This occurs each time the spark jumps across the electrodes 26 and 28 and the thyratron tube 84 is fired.

Switch 94 is also effective to operate the solenoid of the marker 80 by completing a circuit to it through leads 91.

To stop the thyratron from conducting relay 92 (or $R_2$) also opens the normally closed contacts 93 in the thyratron plate circuit and thereby causes it to stop conducting.

The plate voltage for the thyratron tube is supplied from a transformer 100 which feeds through a rectifier tube 102. The voltage is filtered by a filter circuit consisting of a choke 104 and condensers 106 and 108. The filtered D.C. voltage is fed to the thyratron plate through lead 110.

Thus it will be seen that a mechanism has been provided which is capable of testing sheet material at high rates of speed without damaging the material. The mechanism actually functions to seal the smaller holes in the material and may be adjusted to accurately detect even a weakened or thin portion of the material. By adjusting the voltage charge on the main condenser which is connected across the electrodes, the sensitivity of the machine may be adjusted and it may also be adjusted to accommodate materials of varying thicknesses.

Further, the speed at which the main condenser is recharged may be adjusted and thus the minimum distance between holes which will be detected is adjustable.

Because the mechanism is very sensitive to small changes in dielectric strength, the mechanism is practical for testing tubular material such as is shown in Fig. 4. With a machine of less sensitivity, materials of only single thicknesses may be tested since a complete breakdown of dielectric strength is required, but with the mechanism of the present invention a slight reduction in dielectric is detectable and therefore a reduction in strength of one of two layers of a tubular sheet will be noticed by the machine. In order to test tubular material, however, it must be uniform in thickness. The testing machine must be set to a high sensitivity so that a spark will jump with only one layer weakened in dielectric strength but will not jump when both layers are full thickness. It will be obvious if one layer exceeds its standard thickness that a weakness in the second layer may not be detected.

The length of one of the electrodes 26 and 28 must be chosen to be slightly less than the width of the material to be tested so that the material will extend beyond the edges of the electrodes to prevent the spark from jumping around the material edge. With the material bearing against the rotating lower electrode and with the material being kept taut by the mechanism which controls the speed of the motor 16, the material will not move back and forth on the roll 28 but will keep a fixed position with respect to the upper electrode. In the present embodiment, therefore, the upper electrode is shown shorter than the width of the material.

I have, in the drawings and specification, presented a detailed disclosure of the preferred embodiment of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A mechanism for detecting and repairing imperfections in thermoplastic sheet material having dielectric strength greater than air comprising a first and second electrode spaced from each other to form a gap for passing a sheet of material therebetween, a condenser connected between said electrodes, means connected to charge the condenser to a strength sufficient to discharge across said gap when the dielectric strength of the material passed through the gap dropped below a prepredetermined level, said discharge producing sufficient heat to increase the dielectric strength where it was previously below said level, means for moving the material through said gap at a rate so said condenser will only discharge once for each individual area of material below said dielectric level, means in parallel with the condenser generating a signal responsive to the discharge of the condenser, and counting means connected to the condenser and registering responsive to said signal for registering the number of imperfections located.

2. A mechanism for detecting and repairing imperfections in thermoplastic sheet material having dielectric strength greater than air comprising a first and a second electrode positioned opposite each other and spaced to form a gap through which said material is passed, a condenser connected across said electrodes, means connected for impressing a charge on said condenser sufficient to cause a discharge across said gap when the dielectric strength of the material drops below a predetermined level, said discharge being of sufficient heat to increase the dielectric strength of the material at the point which caused the discharge to occur, means for passing said material through said gap at a rate to preclude a second discharge at the same point in the material, means positioned adjacent to said electrodes for marking the location of imperfections, and means connected in parallel with said condenser responsive to the discharge of said condenser and connected to said marking device to mark the material with the condenser discharge.

3. A method of detecting and repairing holes in thermoplastic sheet material comprising the folowing steps: passing the material through a potential field of sufficient strength to cause a spark to pass through said material if the material is less than a predetermined thickness, said spark thus lowering the strength of said field and generating sufficient heat to seal the hole which caused the spark, after said spark, rebuilding the potential strength of said field to its original value, and delaying the rebuilding of said potential strength so that only one spark will occur for a particular hole.

4. A mechanism for detecting and repairing imperfections in thermoplastic sheet material having dielectric strength greater than air comprising a first and second electrode spaced from each other to permit moving the sheet material through the gap formed therebetween, means for moving the said material through said gap, a condenser connected across said electrodes for storing electrical energy to discharge a spark across the electrodes, means associated with the condenser for charging said condenser to a potential sufficient to cause a spark to discharge between the electrodes when not separated by the full dielectric strength of a predetermined thickness of the material, said spark generating sufficient heat to repair the minute imperfections in the material which allowed the spark to appear, said moving means moving the said material through said gap at a rate such that the imperfection which caused the spark is no longer between the electrodes by the time said condenser is recharged to said potential, means manifesting the occurrence of a weakness in said dielectric material upon receipt of a signal, and means in parallel with said condenser, responsive to the condenser discharge and operating to generate said signal to operate said manifestation means upon discharge.

5. A mechanism for detecting and repairing imperfections in thermoplastic sheet material having dielectric strength greater than air comprising a first and second electrode spaced to form a gap to move a sheet of material therebetween, one of said electrodes having a surface movable with said material so as to continually change the surface facing the other electrode, a condenser means associated with said electrodes for impressing a potential across said electrodes, means maintaining a charge on said condenser sufficient to discharge across said gap with the occurrence of a dielectric strength across the gap less than the full dielectric strength of a predetermined thickness of the material, said discharge generating sufficient heat to mend minute imperfections in the dielectric, and means in circuit with said condenser means operating in timed relationship with said moving means for delaying the recharging of said condenser after said discharge until said moving means has moved the imperfection which caused said discharge out of said gap.

6. A mechanism for detecting and repairing holes in thermoplastic sheet material having dielectric strength greater than air comprising a first and second electrode spaced from each other to form a gap, means to move the material through said gap, a condenser connected across the electrodes to maintain them at a potential difference sufficient to discharge across the gap when a dielectric strength less than the full dielectric strength of a predetermined thickness of said material is present, said discharge being of such magnitude to produce sufficient heat to mend the minute holes which caused the discharge, means in electrical connection with the condenser for impressing a voltage on the condenser to recharge it when discharged across the electrodes, and a resistance between said voltage source and condenser having a value increasing the time of recharge after said discharge until said moving means has moved the imperfection which caused said discharge out of said gap.

7. A mechanism for detecting and repairing imperfections in thermoplastic sheet material in accordance with claim 6 in which said condenser may be varied in capacity to change the recharging time of the condenser to adjust the distance between imperfections in the sheet material that will be detected.

References Cited in the file of this patent

UNITED STATES PATENTS

| | | |
|---|---|---|
| 2,522,151 | Weeks | Sept. 12, 1950 |
| 2,614,152 | Herborn | Oct. 14, 1952 |
| 2,650,346 | Rasor | Aug. 25, 1953 |
| 2,659,048 | Zabel et al. | Nov. 10, 1953 |
| 2,701,336 | Anderson | Feb. 1, 1955 |